(12) United States Patent
Hu et al.

(10) Patent No.: US 11,651,618 B2
(45) Date of Patent: May 16, 2023

(54) FINGERPRINT IDENTIFICATION METHOD AND APPARATUS, STORAGE MEDIUM AND TERMINAL

(71) Applicant: Shanghai Harvest Intelligence Technology Co., Ltd., Shanghai (CN)

(72) Inventors: Xueke Hu, Shanghai (CN); Tianyang Wang, Shanghai (CN); Fei Wang, Shanghai (CN); Sheng Feng, Shanghai (CN); Fengjun Gu, Shanghai (CN); Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 0 days.

(21) Appl. No.: 17/503,967

(22) Filed: Oct. 18, 2021

(65) Prior Publication Data
US 2022/0036038 A1  Feb. 3, 2022

Related U.S. Application Data

(62) Division of application No. 16/694,204, filed on Nov. 25, 2019, now Pat. No. 11,176,351.

(30) Foreign Application Priority Data

Nov. 26, 2018 (CN) .......................... 201811417667.6

(51) Int. Cl.
*G06V 40/12* (2022.01)
*G06V 40/13* (2022.01)
(Continued)

(52) U.S. Cl.
CPC .......... *G06V 40/1353* (2022.01); *G06V 40/13* (2022.01); *G01K 7/00* (2013.01); *G01N 27/605* (2013.01)

(58) Field of Classification Search
CPC ............. G06K 9/00073; G06K 9/0008; G06K 9/00013; G01N 27/605; G01K 7/00
See application file for complete search history.

(56) References Cited

U.S. PATENT DOCUMENTS

2005/0069179 A1* 3/2005 Hwang ................ G06V 10/993
382/124
2014/0133711 A1 5/2014 Abe
(Continued)

FOREIGN PATENT DOCUMENTS

| CN | 103065134 A | 4/2013 |
|---|---|---|
| CN | 104598894 A | 5/2015 |

(Continued)

OTHER PUBLICATIONS

Office Action dated Mar. 1, 2023, in Chinese Application No. 201811417667.6.

*Primary Examiner* — Lixi C Simpson
(74) *Attorney, Agent, or Firm* — Harness, Dickey & Pierce, P.L.C.

(57) ABSTRACT

The present disclosure provides a fingerprint identification method and apparatus, a storage medium, and a terminal. The fingerprint identification method includes: collecting a to-be-identified fingerprint image of a to-be-identified fingerprint; identifying whether the to-be-identified fingerprint belongs to a first type of fingerprint; calculating an image correlation between the to-be-identified fingerprint image and a standard fingerprint image, when it's determined that the to-be-identified fingerprint belongs to the first type of fingerprint; calculating a feature point matching result between the to-be-identified fingerprint image and the standard fingerprint image when it's determined that the to-be-identified fingerprint does not belong to the first type of fingerprint; and determining whether the to-be-identified fingerprint is consistent with the standard fingerprint;

(Continued)

wherein the standard fingerprint image is a fingerprint image collected from a standard fingerprint. The solution provided by the present disclosure can effectively improve the accuracy of fingerprint identification.

20 Claims, 4 Drawing Sheets

(51) Int. Cl.
　　　*G01K 7/00*　　　(2006.01)
　　　*G01N 27/60*　　(2006.01)

(56) References Cited

U.S. PATENT DOCUMENTS

| | | | |
|---|---|---|---|
| 2014/0286545 A1* | 9/2014 | Yi | G06V 40/1347 |
| | | | 382/124 |
| 2018/0032784 A1 | 2/2018 | Li et al. | |
| 2019/0188448 A1 | 6/2019 | Kim et al. | |
| 2019/0266373 A1 | 8/2019 | Hirokawa | |
| 2019/0370526 A1 | 12/2019 | Wang et al. | |
| 2020/0202105 A1 | 6/2020 | Zhang et al. | |

FOREIGN PATENT DOCUMENTS

| | | |
|---|---|---|
| CN | 106250887 A | 12/2016 |
| CN | 107491727 A | 12/2017 |
| CN | 108573137 A | 9/2018 |

* cited by examiner

| calculating an image correlation of the to-be-identified fingerprint image and at least one offset image of the standard fingerprint image respectively | ─ S1021 |

| determining an image correlation having a maximum value as the image correlation between the to-be-identified fingerprint image and the standard fingerprint image | ─ S1022 |

FINGERPRINT IDENTIFICATION METHOD AND APPARATUS, STORAGE MEDIUM AND TERMINAL

CROSS-REFERENCE TO RELATED APPLICATIONS

This application is a divisional application of U.S. application Ser. No. 16/694,204 filed on Nov. 25, 2019, which claims the benefit of priority to Chinese patent application No. 201811417667.6, filed on Nov. 26, 2018. The entire contents of this application are hereby incorporated herein by reference.

TECHNICAL FIELD

The present disclosure relates to the technical field of fingerprint identification, and more particularly to a fingerprint identification method and apparatus, a storage medium, and a terminal.

BACKGROUND

With the rapid development of technology, application of biometric technology is becoming more and more wide. Among them, the development and application of fingerprint identification is the most popular.

Existing fingerprint identification solution is mainly realized by extracting feature points in a fingerprint image for comparison.

However, when identifying a fingerprint of a finger, such as a "dry finger", a fingerprint identification result obtained by using existing feature point matching solution generally has a problem of high error rate and low accuracy.

SUMMARY

Embodiments of the present disclosure provide a method for improving the accuracy of fingerprint identification.

Specifically, embodiments of the present disclosure provide a fingerprint identification method. The fingerprint identification method includes: capturing a to-be-identified fingerprint image of a to-be-identified fingerprint; identifying whether the to-be-identified fingerprint belongs to a first type of fingerprint; when it's determined that the to-be-identified fingerprint belongs to the first type of fingerprint, determining whether the to-be-identified fingerprint is consistent with a standard fingerprint according to an image correlation between the to-be-identified fingerprint image and a standard fingerprint image; when it's determined that the to-be-identified fingerprint does not belong to the first type of fingerprint, determining whether the to-be-identified fingerprint is consistent with the standard fingerprint according to a feature point matching result between the to-be-identified fingerprint image and the standard fingerprint image; wherein the standard fingerprint image is a fingerprint image captured from a standard fingerprint.

In some embodiments, identifying whether the to-be-identified fingerprint belongs to the first type of fingerprint includes: identifying whether the to-be-identified fingerprint belongs to the first type of fingerprint according to an image information of the to-be-identified fingerprint image and/or an environment parameter.

In some embodiments, identifying whether the to-be-identified fingerprint belongs to the first type of fingerprint further includes: fitting gray values of pixels at a plurality of preset positions to identify whether a periodically changing curve can be obtained.

In some embodiments, identifying whether the to-be-identified fingerprint belongs to the first type of fingerprint further includes: determining the to-be-identified fingerprint belongs to the first type of fingerprint if it is identified that the periodically changing curve cannot be obtained.

In some embodiments, identifying whether the to-be-identified fingerprint belongs to the first type of fingerprint further includes: calculating a contrast of the to-be-identified fingerprint image according to the gray values of the pixels at the plurality of preset positions, when it is identified that the periodically changing curve can be obtained; identifying whether the contrast is greater than a first preset threshold.

In some embodiments, the method further includes: determining the to-be-identified fingerprint belongs to the first type of fingerprint when any one or any combination of the following conditions are met: it is identified that the contrast is smaller than the first preset threshold, it is identified that the periodically changing curve cannot be obtained, if the environment parameter is smaller than a second preset threshold.

In some embodiments, wherein identifying whether the to-be-identified fingerprint belongs to the first type of fingerprint further includes: determining the to-be-identified fingerprint belongs to the first type of fingerprint when an appropriate number of feature points cannot be extracted from the fingerprint image, or the number of feature points that can be extracted from the fingerprint image is less than a preset threshold.

In some embodiments, the first type of fingerprint includes fingerprint of a finger having shallow skin ridge at a finger pulp, fingerprint of a finger with a higher dryness, fingerprint of a finger with insufficient sebum secretion, feature points cannot be extracted from the captured to-be-identified fingerprint images, or the number of feature points that can be extracted from the captured to-be-identified fingerprint images is less than a preset threshold.

In some embodiments, the image correlation is applied to measure a similarity degree and a correlation matching degree of the to-be-identified fingerprint image and the standard fingerprint image at different relative positions.

In some embodiments, calculating a contrast of the to-be-identified fingerprint image according to the gray values of the pixels at the plurality of preset positions includes: determining a maximum gray value and a minimum gray value among the gray values of the pixels at the plurality of preset positions according to the obtained periodically changing curve; calculating the contrast of the to-be-identified fingerprint image according to the maximum gray value and the minimum gray value.

In some embodiments, the fingerprint identification method further includes: making at least one auxiliary line on the to-be-identified fingerprint image; and determining pixels of the to-be-identified fingerprint image which each of the at least one auxiliary line passes through as the pixels at the plurality of preset positions.

In some embodiments, identifying whether the to-be-identified fingerprint belongs to the first type of fingerprint according to an environment parameter includes: determining the to-be-identified fingerprint belongs to the first type of fingerprint when the environment parameter is smaller than a second preset threshold.

In some embodiments, the environment parameter is selected from a temperature and a humidity.

In some embodiments, when it's determined that the to-be-identified fingerprint belongs to the first type of fingerprint, determining whether the to-be-identified fingerprint is consistent with a standard fingerprint according to an image correlation between the to-be-identified fingerprint image and a standard fingerprint image includes: sending a prompt information for prompting to capture an auxiliary to-be-identified fingerprint image of the to-be-identified fingerprint; capturing the auxiliary to-be-identified fingerprint image of the to-be-identified fingerprint; correcting the to-be-identified fingerprint image according to the auxiliary to-be-identified fingerprint image; and calculating the image correlation between the corrected to-be-identified fingerprint image and the standard fingerprint image; determining whether the to-be-identified fingerprint is consistent with the standard fingerprint according to an image correlation between the corrected to-be-identified fingerprint image and a standard fingerprint image.

In some embodiments, when it's determined that the to-be-identified fingerprint belongs to the first type of fingerprint, the method further includes: calculating an image correlation of the to-be-identified fingerprint image and at least one offset image of the standard fingerprint image respectively; and determining an image correlation having a maximum value as the image correlation between the to-be-identified fingerprint image and the standard fingerprint image.

In some embodiments, calculating an image correlation of the to-be-identified fingerprint image and at least one offset image of the standard fingerprint image respectively includes: for each offset image of the standard fingerprint image, calculating the image correlation between the to-be-identified fingerprint image and the each offset image according to a gray value of each pixel of the to-be-identified fingerprint image and a gray value of a corresponding pixel of the each offset image.

In some embodiments, the fingerprint identification method further includes: normalizing the calculated image correlation according to the gray values of the to-be-identified fingerprint image and the gray values of the standard fingerprint image to obtain the image correlation between the to-be-identified fingerprint image and the offset image.

In some embodiments, the offset image refers to an image obtained by offsetting the standard fingerprint image by a row or a column of pixels with respect to the to-be-identified fingerprint image, taking a position where the standard fingerprint image coincides with the to-be-identified fingerprint image as a reference.

In some embodiment, the calculated image correlation is normalized based on the following formula:

$$C(m, l) = \frac{\sum_{ij} N_{ij} \cdot M_{i+m,j+l}}{\sqrt{\sum_{ij} N_{ij}^2} \sqrt{\sum_{ij} M_{ij}^2}}$$

wherein, C(m, l) is the image correlation between the to-be-identified fingerprint image and the offset image, m is a line offset value of the offset image relative to the standard fingerprint image, l is a column offset value of the offset image relative to the standard fingerprint image, $$\sum_{ij} N_{ij} \cdot M_{i+m,j+l}$$

is the calculated correlation, $$\sqrt{\sum_{ij} N_{ij}^2} \sqrt{\sum_{ij} M_{ij}^2}$$

is a normalization measurement standard, $N_{ij}$ is a gray value of a pixel at an i-th row and a j-th column of the to-be-identified fingerprint image, $M_{ij}$ is a gray value of a pixel at an i-th row and a j-th column of the standard fingerprint image, and $M_{i+m,j+l}$ is a gray value of a pixel at an (i+m)-th row and a (j+l)-th column of the offset image, wherein i is a positive integer, and j is a positive integer.

Embodiments of the present disclosure further provide a fingerprint identification apparatus. The fingerprint identification apparatus includes: a first collecting module, configured to capture a to-be-identified fingerprint image of a to-be-identified fingerprint; an identifying module, configured to identify whether the to-be-identified fingerprint belongs to a first type of fingerprint; a first calculating module, configured to calculate an image correlation between the to-be-identified fingerprint image and a standard fingerprint image when it's determined that the to-be-identified fingerprint belongs to the first type of fingerprint, and configured to calculate a feature point matching result between the to-be-identified fingerprint image and the standard fingerprint image when it's determined that the to-be-identified fingerprint does not belong to the first type of fingerprint, wherein the standard fingerprint image is a fingerprint image collected from a standard fingerprint; and a determining module, configured to determine whether the to-be-identified fingerprint is consistent with the standard fingerprint according to the image correlation.

In some embodiment, the identifying module is configured to identify whether the to-be-identified fingerprint belongs to a first type of fingerprint according to an image information of the to-be-identified fingerprint image and/or an environment parameter.

In some embodiment, the identifying module includes: a fitting sub-module, configured to fit gray values of the pixels at the plurality of preset positions to identify whether a periodically changing curve can be obtained.

In some embodiment, the identifying module further includes: a first determining sub-module, configured to determine the to-be-identified fingerprint belongs to the first type of fingerprint if it is identified that the periodically changing curve cannot be obtained.

In some embodiment, the identifying module further includes: a first calculating sub-module, configured to calculate a contrast of the to-be-identified fingerprint image according to the gray values of the pixels at the plurality of preset positions, if it is identified that the periodically changing curve can be obtained; an identifying sub-module, configured to identify whether the contrast is larger than a first preset threshold; and a second determining sub-module, configured to determine the to-be-identified fingerprint belongs to the first type of fingerprint if it is identified that the contrast is smaller than the first preset threshold.

In some embodiment, the first calculating sub-module includes: a first determining unit, configured to determine a maximum gray value and a minimum gray value among the gray values of the pixels at the plurality of preset positions according to the periodically changing curve obtained by the fitting; and a first calculating unit, configured to calculate the contrast of the to-be-identified fingerprint image according to the maximum gray value and the minimum gray value.

In some embodiment, the obtaining sub-module includes: an auxiliary line generating unit, configured to make at least one auxiliary line on the to-be-identified fingerprint image; and a second determining unit, configured to determine the pixels of the to-be-identified fingerprint image which each of the at least one auxiliary line passes through as the pixels at the plurality of preset positions.

In some embodiment, the identifying module includes: a third determining sub-module, configured to determine the to-be-identified fingerprint belongs to the first type of fingerprint if the environment parameter is less than a second preset threshold.

In some embodiment, the environment parameter is selected from a temperature and a humidity.

In some embodiment, the fingerprint identification apparatus further includes: a prompting module, configured to send a prompt information for prompting to collect an auxiliary to-be-identified fingerprint image of the to-be-identified fingerprint, if it is identified that the to-be-identified fingerprint belongs to the first type of fingerprint, before calculating the image correlation between the to-be-identified fingerprint image and the standard fingerprint image; a second collecting module, configured to collect the auxiliary to-be-identified fingerprint image of the to-be-identified fingerprint; a correcting module, configured to correct the to-be-identified fingerprint image according to the auxiliary to-be-identified fingerprint image; and a second calculating module, configured to calculate an image correlation between the corrected to-be-identified fingerprint image and the standard fingerprint image.

In some embodiment, the first calculating module includes: a second calculating sub-module, configured to calculate an image correlation between the to-be-identified fingerprint image and at least one offset image of the standard fingerprint image respectively; and a fourth determining sub-module, configured to determine an image correlation having a maximum value as the image correlation between the to-be-identified fingerprint image and the standard fingerprint image.

In some embodiment, the second calculating module includes: a second calculating unit, configured to calculate the image correlation between the to-be-identified fingerprint image and the offset image according to the gray value of each pixel of the to-be-identified fingerprint image and the gray value of a corresponding pixel of the offset image for each offset image of the standard fingerprint image.

In some embodiment, the second calculating unit includes: a third calculating unit, configured to traverse each pixel of the to-be-identified fingerprint image, and calculate a correlation between the gray value of the pixel of the to-be-identified fingerprint image and the gray value of the corresponding pixel of the offset image; and a normalizing process unit, configured to normalize the calculated correlation to obtain the image correlation between the to-be-identified fingerprint image and the offset image according to the gray values of the to-be-identified fingerprint image and the gray values of the standard fingerprint image.

In some embodiment, the calculated image correlation is normalized by the normalizing process unit based on the following formula:

$$C(m, l) = \frac{\sum_{ij} N_{ij} \cdot M_{i+m,j+l}}{\sqrt{\sum_{ij} N_{ij}^2} \sqrt{\sum_{ij} M_{ij}^2}}$$

wherein, $C(m, l)$ is the image correlation between the to-be-identified fingerprint image and the offset image, m is a line offset value of the offset image relative to the standard fingerprint image, l is a column offset value of the offset image relative to the standard fingerprint image, $$\sum_{ij} N_{ij} \cdot M_{i+m,j+l}$$

is the calculated correlation, $$\sqrt{\sum_{ij} N_{ij}^2} \sqrt{\sum_{ij} M_{ij}^2}$$

is a normalization measurement standard, $N_{ij}$ is a gray value of a pixel at an i-th row and a j-th column of the to-be-identified fingerprint image, $M_{ij}$ is a gray value of a pixel at an i-th row and a j-th column of the standard fingerprint image, and $M_{i+m,j+l}$ is a gray value of a pixel at an (i+m)-th row and a (j+l)-th column of the offset image, wherein i is a positive integer, and j is a positive integer.

In some embodiments, the determining module is configured to determine the to-be-identified fingerprint belongs to the first type of fingerprint when an appropriate number of feature points cannot be extracted from the fingerprint image, or the number of feature points that can be extracted from the fingerprint image is less than a preset threshold.

Embodiments of the present disclosure further provide a storage medium, having stored thereon computer instructions, wherein the computer instructions are executed to perform steps of the above-mentioned fingerprint identification method.

Embodiments of the present disclosure further provide a terminal, including a memory and a processor, wherein the memory has stored thereon computer instructions executable on the processor, and the computer instructions are executed by the processor to perform steps of the above-mentioned fingerprint identification method.

Compared with the prior art, embodiments of the present disclosure have the following beneficial effects.

An embodiment of the present disclosure provides a fingerprint identification method, including: collecting a to-be-identified fingerprint image of a to-be-identified fingerprint; calculating an image correlation between the to-be-identified fingerprint image and a standard fingerprint image, wherein the standard fingerprint image is a fingerprint image collected from a standard fingerprint; and determining whether the to-be-identified fingerprint is consistent with the standard fingerprint according to the image correlation. Compared with existing fingerprint identification solution based on feature point matching, the present disclosure determines whether the to-be-identified fingerprint is consistent with the standard fingerprint according to the image correlation between the to-be-identified fingerprint image and the standard fingerprint image, and can effectively avoid the influence of a depth of skin ridge and number of the feature points contained in the fingerprint image on the identification result, thereby greatly improving the accuracy of fingerprint identification.

Further, the fingerprint identification method further includes: identifying whether the to-be-identified fingerprint belongs to a first type of fingerprint according to an image information and/or an environment parameter of the to-beidentified fingerprint image, before calculating the image correlation between the to-be-identified fingerprint image and the standard fingerprint image; and calculating the image correlation between the to-be-identified fingerprint image and the standard fingerprint image if it is identified that the to-be-identified fingerprint belongs to the first type of fingerprint. Thus, the present disclosure is applicable to the to-be-identified fingerprints in different states flexibly, and can optimize the accuracy of fingerprint identification by using pertinent fingerprint identification logic. For example, the identification logic of the image correlation may be applied to the first type of fingerprint, and the identification logic of the existing feature point matching may be applied to the non-first type of fingerprint. The first type of fingerprint may be a fingerprint collected from a finger having a shallower skin ridge, and the non-first type fingerprint may be a fingerprint collected from a finger having a deeper skin ridge, and the depth of the skin ridge may be based on whether the feature points can be extracted from the fingerprint image.

DETAILED DESCRIPTION

As mentioned in the background art, the existing fingerprint identification solution has many drawbacks, especially in a fingerprint identification situation such as a dry finger, there is a problem of high identification error rate.

The term "dry finger" herein refers to a finger having shallow skin ridge at a finger pulp, a finger with a higher dryness, a finger with insufficient sebum secretion, etc., and feature points cannot be extracted from collected fingerprint images of these fingers.

For example, compared with a normal finger with normal sebum secretion, the fingerprint ridge of the finger with insufficient sebum secretion is hard. When the finger is pressed onto a fingerprint collector, the contact area of the fingerprint ridge and a fingerprint collection screen of the fingerprint collector will not change with the change of a pressing force of the finger, which leads to thin and shallow lines and unclear overall imaging in the fingerprint image finally collected, so the feature points cannot be extracted.

Inventors of the present disclosure have found through analysis that the above problem is caused by the fact that for a fingerprint image collected from a dry finger, it is highly likely that effective feature points cannot be extracted therefrom, or the number of feature points that can be extracted is small. When the number of the feature points applicable to feature point matching is insufficient, the identification accuracy of such fingerprints is low.

An embodiment of the present disclosure provides a fingerprint identification method. The fingerprint identification method includes: collecting a to-be-identified fingerprint image of a to-be-identified fingerprint; calculating an image correlation between the to-be-identified fingerprint image and a standard fingerprint image, wherein the standard fingerprint image is a fingerprint image collected from a standard fingerprint; and determining whether the to-be-identified fingerprint is consistent with the standard fingerprint according to the image correlation.

It is understood by those skilled in the art that, by determining whether the to-be-identified fingerprint is consistent with the standard fingerprint according to the image correlation between the to-be-identified fingerprint image and the standard fingerprint image, the present embodiment can effectively avoid the influence of the depth of the skin ridge on the identification result, thereby greatly improving the accuracy of fingerprint identification.

The above objects, features and advantages of the present disclosure will become more apparent from the detailed description of the embodiments taken in conjunction with the accompanying drawings.

Figure 1:
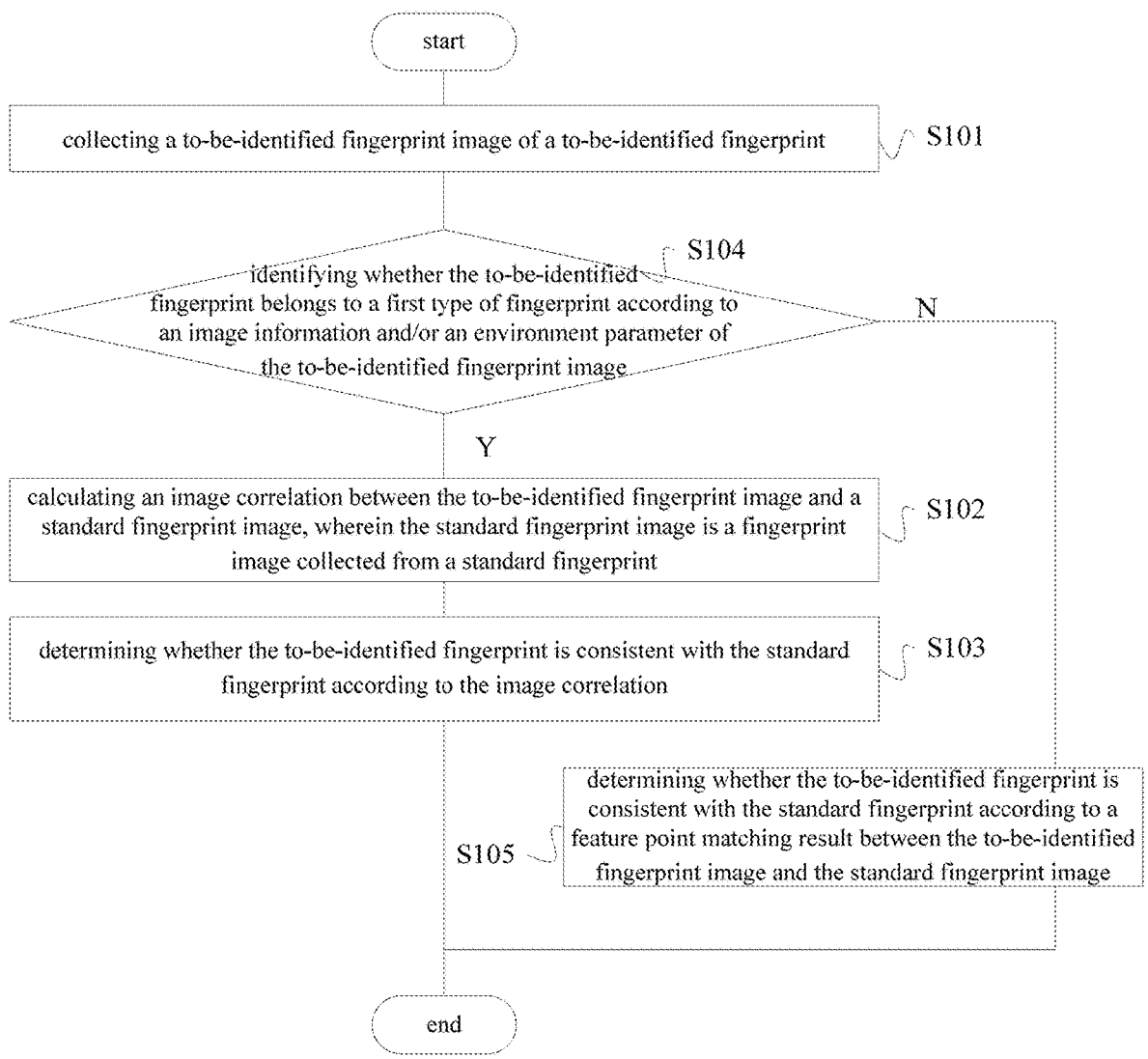
FIG. 1 is a flow chart of a fingerprint identification method according to an embodiment of the present disclosure.

FIG. 1 is a flow chart of a fingerprint identification method according to an embodiment of the present disclosure. Solution of this embodiment can be applied to a fingerprint identification situation for a dry finger.

Specifically, referring to FIG. 1, the fingerprint identification method according to some embodiment may include the following steps:

step S101, collecting a to-be-identified fingerprint image of a to-be-identified fingerprint;

step S102, calculating an image correlation between the to-be-identified fingerprint image and a standard fingerprint image, wherein the standard fingerprint image is a fingerprint image collected from a standard fingerprint; and step S103: determining whether the to-be-identified fingerprint is consistent with the standard fingerprint according to the image correlation.

Therefore, the solution according to some embodiment can determine whether the to-be-identified fingerprint is consistent with the standard fingerprint according to the image correlation between the to-be-identified fingerprint image and the standard fingerprint image, and can effectively avoid the influence of the depth of the skin ridge and the number of feature points contained in the fingerprint image on the identification result, thereby greatly improving the accuracy of fingerprint identification and reducing the error rate.

More specifically, the image correlation may be used to measure similarity degree and related matching degree of the to-be-identified fingerprint image and the standard fingerprint image at different relative positions.

Further, in the step S101, the to-be-identified fingerprint image of the to-be-identified fingerprint may be collected by using a fingerprint collection apparatus such as an optical fingerprint sensor.

In a non-limiting embodiment, the fingerprint identification can be implemented by combining existing feature point matching means and the image correlation solution of the present embodiment to flexibly cope with the to-be-identified fingerprints in different states, and adopting pertinent fingerprint identification logic to optimize the accuracy of fingerprint identification.

For example, the identification logic of the image correlation may be applied to the first type of fingerprint, and the identification logic of the existing feature point matching may be applied to the non-first type of fingerprint. The first type of fingerprint may be a fingerprint collected from a finger having a shallower skin ridge, and the non-first type fingerprint may be a fingerprint collected from a finger having a deeper skin ridge, and the depth of the skin ridge may be measured based on whether the feature points can be extracted from the fingerprint image.

Specifically, with reference to FIG. 1, the fingerprint identification method according to some embodiment further includes: step 104, identifying whether the to-be-identified fingerprint belongs to the first type of fingerprint according to an image information and/or an environment parameter of the to-be-identified fingerprint image, before performing the step 102, after performing the step S101 to obtain the to-be-identified fingerprint image.

If the step S104 is yes, that is, if it is identified that the to-be-identified fingerprint belongs to the first type of fingerprint, step S102 is performed to calculate the image correlation between the to-be-identified fingerprint image and the standard fingerprint image. Further, step S103 is performed to determine whether the to-be-identified fingerprint is consistent with the standard fingerprint according to the image correlation.

Otherwise, if the step S104 is no, that is, if it is identified that the to-be-identified fingerprint does not belong to the first type of fingerprint (i.e., belongs to the non-first type of fingerprint), step S105 is performed to determine whether the to-be-identified fingerprint is consistent with the standard fingerprint according to a feature point matching result between the to-be-identified fingerprint image and the standard fingerprint image.

In a non-limiting embodiment, the step S105 may include: extracting a feature fingerprint point (simply referred to as feature point) from the to-be-identified fingerprint image; and identifying whether the feature fingerprint point in the to-be-identified fingerprint image is consistent with that in the standard fingerprint image; if yes, determining that the to-be-identified fingerprint is consistent with the standard fingerprint.

In a non-limiting embodiment, the image information of the to-be-identified fingerprint image may include: a gray value of at least one pixel in the image information. Further, the gray value of the at least one pixel may be fitted to obtain a curve for describing a change of the gray value of the to-be-identified fingerprint image, and whether the to-be-identified fingerprint being a fingerprint of a dry finger may be identified according to the curve.

Figure 2:
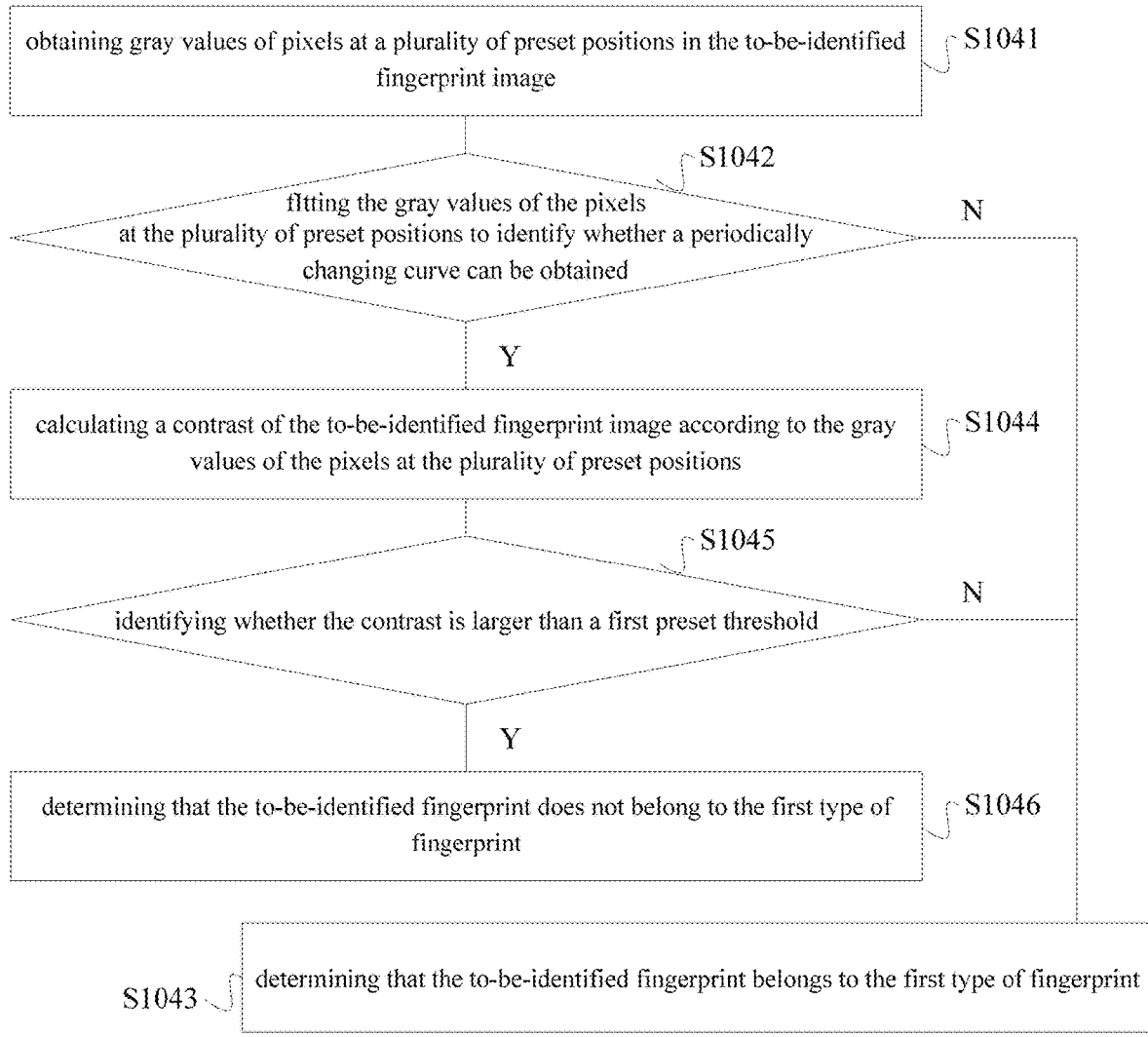
FIG. 2 is a flow chart of a specific embodiment of step S104 in FIG. 1.

In a non-limiting embodiment, referring to FIG. 2, the step S104 may include the following steps:

step S1041: obtaining gray values of pixels at a plurality of preset positions in the to-be-identified fingerprint image; and step S1042: fitting the gray values of the pixels at the plurality of preset positions to identify whether a periodically changing curve can be obtained.

If the step S1042 is no, that is, if it is identified that the periodically changing curve cannot be obtained, the step S104 may further include: step S1043, determining the to-be-identified fingerprint belongs to the first type of fingerprint.

Otherwise, if the step S1042 is yes, that is, if it is identified that the periodically changing curve can be obtained, the step S104 may further include: step S1044, calculating a contrast of the to-be-identified fingerprint image according to the gray values of the pixels at the plurality of preset positions; and step S1045, identifying whether the contrast is larger than a first preset threshold.

If the step S1045 is no, that is, if it is identified that the contrast is smaller than the first preset threshold, the step S1043 is performed to determine the to-be-identified fingerprint belongs to the first type of fingerprint.

Otherwise, if the step S1045 is yes, that is, if it is identified that the contrast is larger than the first preset threshold, the step S104 may further include: step S1046, determining that the to-be-identified fingerprint does not belong to the first type of fingerprint.

Herein, "larger than" contains larger than or equal to, or "smaller than" contains smaller than or equal to.

In a non-limiting embodiment, the pixels at the plurality of preset positions may be pixels at specific positions in the to-be-identified fingerprint image, for example, the pixels which a center line or a diagonal line of the to-be-identified fingerprint image passes through.

Alternatively, the pixels at the plurality of preset positions may also be pixels randomly selected from the to-be-identified fingerprint image.

In a non-limiting embodiment, the step S1041 may include: making at least one auxiliary line on the to-be-identified fingerprint image; and determining the pixels of the to-be-identified fingerprint image which each of the at least one auxiliary line passes through as the pixels at the plurality of preset positions.

Specifically, the auxiliary line may be parallel to the center line or the diagonal line, or the like of the to-be-identified fingerprint image. Alternatively, the auxiliary line may be a straight line in any direction.

More specifically, the term "pass through" refers to that the pixels coincide with the auxiliary line, that is, the pixels fall on the auxiliary line.

Figures 3, 4:
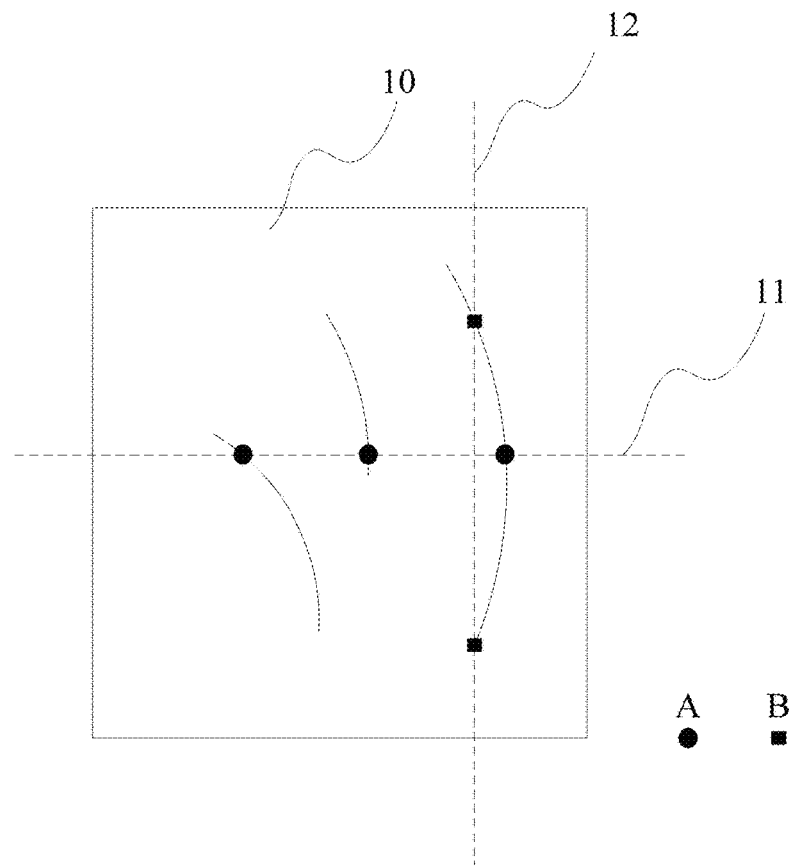
FIG. 3 is a schematic view of a principle of step S1041 in FIG. 2.
FIG. 4 is a flow chart of a specific embodiment of step S102 in FIG. 1.

For example, referring to FIG. 3, for a collected to-be-identified fingerprint image 10, the ridges of the to-be-identified fingerprint are indicated by three curves in the to-be-identified fingerprint image 10 for the sake of clarity. Specifically, when performing the step S1041, an auxiliary line 11 may be made on the to-be-identified fingerprint image 10, and the pixels involved at an intersection of the auxiliary line 11 and each ridge in the to-be-identified fingerprint image 10 may be determined as the pixels at the plurality of preset positions. In the embodiment as shown in FIG. 3, the pixel A at three preset positions can be obtained.

The inventors of the present disclosure have found through analysis that when the gray values of the pixels at the plurality of preset positions in the fingerprint image of the first type of fingerprint are fitted, the periodically changing curve generally cannot be obtained, because the fingerprint ridge of the first type of fingerprint is too shallow to obtain the fingerprint image with obvious periodically changes, or even if the periodically changing curve can be obtained, a signal-to-noise ratio of the curve is not ideal and an appropriate number of feature points cannot be extracted from the fingerprint image.

Therefore, in some embodiment, the step S1042 is performed to initially determine whether the to-be-identified fingerprint is a fingerprint of the dry finger, and then a suitable fingerprint identification strategy is selected for subsequent fingerprint identification operation.

Specifically, the fitting may include a sine or cosine fitting, and may also include other fitting means with a periodically changing trend.

In a non-limiting embodiment, if the step S1042 is yes, whether the signal-to-noise ratio of the to-be-identified fingerprint is ideal may be further determined.

In some embodiment, the signal-to-noise ratio can be measured by a contrast ratio.

Specifically, the step S1044 may include: determining a maximum gray value and a minimum gray value among the gray values of the pixels at the plurality of preset positions according to the periodically changing curve obtained by the fitting; and calculating the contrast of the to-be-identified fingerprint image according to the maximum gray value and the minimum gray value.

For example, the contrast may be calculated based on the following formula:

$$C = \frac{I_{max} - I_{min}}{I_{max} + I_{min}}$$

wherein C is the contrast, $I_{max}$ is the maximum gray value, and the $I_{min}$ is the minimum gray value.

In some embodiment, a peak of the periodically changing curve obtained by the fitting may be used as the maximum gray value, and a trough of the periodically changing curve obtained by the fitting may be used as the minimum gray value.

Therefore, whether a changing difference between light and shade of the fingerprint ridge of the to-be-identified fingerprint image is ideal may be identified by the contrast, for example, whether it is ideal enough to extract the feature points, thereby facilitating more accurate identification of the first type of fingerprint and the non-first type fingerprint.

In a non-limiting embodiment, a plurality of auxiliary lines may be made, and the plurality of auxiliary lines are parallel, partially parallel or non-parallel to each other. Steps S1041 to S1046 are respectively performed for the pixels at the plurality of preset positions through which each of the auxiliary lines passes, wherein if more than a half of the auxiliary lines are unsuccessful in the fitting, or the contrast is smaller than the first preset threshold, it can be determined that the to-be-identified fingerprint belongs to the first type of fingerprint.

For example, continuing to refer to FIG. 3, on the basis of the auxiliary line 11, an auxiliary line 12 may also be made. If the sine fitting of the gray value of the pixel B obtained based on the auxiliary line 12 and the sine fitting of the gray value of the pixel A obtained based on the auxiliary line 11 are unsuccessful, it can be determined that the to-be-identified fingerprint corresponding to the to-be-identified fingerprint image 10 belongs to the first type of fingerprint.

In a non-limiting embodiment, the first preset threshold may be 0.9. In practical applications, a specific value of the first preset threshold may also be adjusted by those skilled in the art as needed.

In a non-limiting embodiment, the step S104 may include: determining the to-be-identified fingerprint belongs to the first type of fingerprint if the environment parameter is smaller than a second preset threshold.

In a non-limiting embodiment, the environment parameter may be selected from a temperature and a humidity. In practical applications, the environment parameter may also include other indicators that can measure a dryness of a collected environment.

Further, the environment parameter may be collected by an external sensor such as a humidity sensor or a temperature sensor. The external sensor may be integrated into a fingerprint sensor or may be a collection device separated from the fingerprint sensor.

Taking the fingerprint identification situation of a mobile phone as an example, the temperature sensor, the humidity sensor, and the fingerprint sensor may be integrated into the mobile phone.

In a non-limiting embodiment, whether the to-be-identified fingerprint belongs to the first type of fingerprint may be comprehensively identified according to the image information and the environment parameter of the to-be-identified fingerprint image. For example, when the periodically changing curve cannot be obtained by the fitting, or the contrast of the to-be-identified fingerprint image is smaller than the first preset threshold, and the environment parameter is smaller than the second preset threshold, it is identified that the to-be-identified fingerprint belongs to the first type of fingerprint.

In a non-limiting embodiment, if in the step 104, it is identified that the to-be-identified belongs to the first type of fingerprint, the fingerprint identification method according to some embodiment may further includes: before performing the step S102, sending a prompt information for prompting to collect an auxiliary to-be-identified fingerprint image of the to-be-identified fingerprint; collecting the auxiliary to-be-identified fingerprint image of the to-be-identified fingerprint; correcting the to-be-identified fingerprint image according to the auxiliary to-be-identified fingerprint image; and calculating the image correlation between the corrected to-be-identified fingerprint image and the standard fingerprint image.

Specifically, the auxiliary to-be-identified fingerprint image may be the fingerprint image of a recollected to-be-identified fingerprint.

For example, the prompt information may prompt a provider of the to-be-identified fingerprint to press more heavily to collect a clearer to-be-identified fingerprint image.

Alternatively, the auxiliary to-be-identified fingerprint image may also be the fingerprint image of a partial region of the recollected to-be-identified fingerprint. For example, it may be the fingerprint image of an edge region of the to-be-identified fingerprint.

In some embodiment, correcting the to-be-identified fingerprint image according to the auxiliary to-be-identified fingerprint image may include: repairing the to-be-identified fingerprint image based on the auxiliary to-be-identified fingerprint image to obtain a more complete to-be-identified fingerprint image.

As a variation, the to-be-identified fingerprint image may also be directly replaced by the auxiliary to-be-identified fingerprint image.

As another variation, correcting the to-be-identified fingerprint image according to the auxiliary to-be-identified fingerprint image may include: generating a three-dimensional fingerprint image based on the to-be-identified fingerprint image and the auxiliary to-be-identified fingerprint image, so as to improve the accuracy of fingerprint identification.

Further, sending the prompt information and collecting the auxiliary to-be-identified fingerprint image may be performed multiple times, that is, after each time the auxiliary to-be-identified fingerprint image is collected and the to-be-identified fingerprint image is corrected, the step S104 is performed again, until the step S104 is no.

In a non-limiting embodiment, the step S102 may include the following steps:

step S1021, calculating an image correlation of the to-be-identified fingerprint image and at least one offset image of the standard fingerprint image respectively;

step S1022, determining an image correlation having a maximum value as the image correlation between the to-be-identified fingerprint image and the standard fingerprint image.

Specifically, the offset image refers to an image obtained by offsetting the standard fingerprint image by a row or a column of pixels with respect to the to-be-identified fingerprint image, taking a position where the standard fingerprint image coincides with the to-be-identified fingerprint image as a reference. Thus, the number of the at least one offset image may be consistent with the number of rows or columns of the pixels of the to-be-identified fingerprint image or the standard fingerprint image.

In a non-limiting embodiment, the step S1021 may include: calculating the image correlation between the to-be-identified fingerprint image and the offset image according to the gray value of each pixel of the to-be-identified fingerprint image and the gray value of a corresponding pixel of the offset image for each offset image of the standard fingerprint image.

Specifically, traversing each pixel of the to-be-identified fingerprint image, and calculating a correlation between the gray value of the pixel of the to-be-identified fingerprint image and the gray value of the corresponding pixel of the offset image; and normalizing the calculated correlation to obtain the image correlation between the to-be-identified fingerprint image and the offset image according to the gray values of the to-be-identified fingerprint image and the gray values of the standard fingerprint image.

Further, the calculated image correlation is normalized based on the following formula:

$$C(m, l) = \frac{\sum_{ij} N_{ij} \cdot M_{i+m,j+l}}{\sqrt{\sum_{ij} N_{ij}^2} \sqrt{\sum_{ij} M_{ij}^2}}$$

wherein, C(m, l) is the image correlation between the to-be-identified fingerprint image and the offset image, m is a line offset value of the offset image relative to the standard fingerprint image, l is a column offset value of the offset image relative to the standard fingerprint image, $$\sum_{ij} N_{ij} \cdot M_{i+m,j+l}$$

is the calculated correlation, $$\sqrt{\sum_{ij} N_{ij}^2} \sqrt{\sum_{ij} M_{ij}^2}$$

is a normalization measurement standard, $N_{ij}$ is a gray value of a pixel at an i-th row and a j-th column of the to-be-identified fingerprint image, $M_{ij}$ is a gray value of a pixel at an i-th row and a j-th column of the standard fingerprint image, and $M_{i+m,j+l}$ is a gray value of a pixel at an (i+m)-th row and a (j+l)-th column of the offset image, wherein i is a positive integer, and j is a positive integer.

Advantageously, the influence of the gray values on the calculation result can be eliminated by the normalizing process.

In a non-limiting embodiment, the step S1022 may be replaced by: during performing the step S1021, each time when the image correlation between the to-be-identified fingerprint image and the offset image of the standard fingerprint image is obtained, determining whether the image correlation is larger than a third preset threshold, and if it is identified that the image correlation is larger than the third preset threshold, determining that the to-be-identified fingerprint image is consistent with the standard fingerprint image.

Therefore, the amount of calculation can be further reduced, and the efficiency of fingerprint identification is optimized.

In some embodiment, the third preset threshold may be 0.8. In practical applications, a specific value of the third preset threshold may be adjusted by those skilled in the art as needed. For example, the third preset threshold can be adjusted according to the accuracy of the fingerprint identification as needed.

Figure 5:
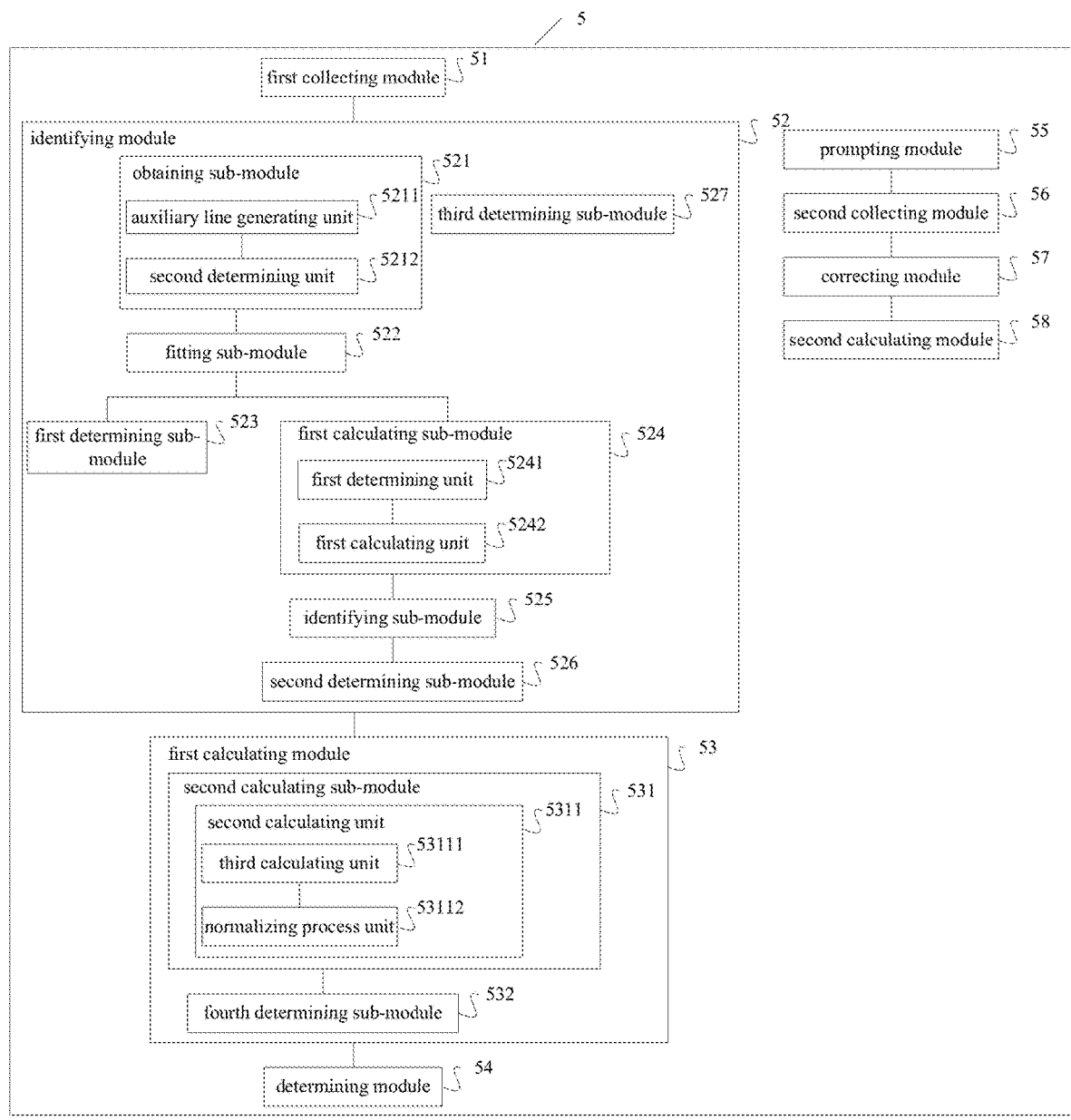
FIG. 5 is a schematic structural view of a fingerprint identification apparatus according to an embodiment of the present disclosure.

FIG. 5 is a schematic structural view of a fingerprint identification module according to an embodiment of the present disclosure. It is understood by those skilled in the art that a fingerprint identification apparatus 5 according to some embodiment can be used to implement the method described in the embodiments as shown in FIGS. 1 to 4.

Specifically, in some embodiment, the fingerprint identification apparatus 5 may include: a first collecting module 51, configured to collect a to-be-identified fingerprint image of a to-be-identified fingerprint; a first calculating module 53, configured to calculate an image correlation between the to-be-identified fingerprint image and a standard fingerprint image, wherein the standard fingerprint image is a fingerprint image collected from a standard fingerprint; and a determining module 54, configured to determine whether the to-be-identified fingerprint is consistent with the standard fingerprint according to the image correlation.

In a non-limiting embodiment, the fingerprint identification apparatus 5 may further include: an identifying module 52, configured to identify whether the to-be-identified fingerprint belongs to a first type of fingerprint according to an image information and/or an environment parameter of the to-be-identified fingerprint image, before calculating the image correlation between the to-be-identified fingerprint image and the standard fingerprint image, and calculating the image correlation between the to-be-identified fingerprint image and the standard fingerprint image if it is identified that the to-be-identified fingerprint belongs to the first type of fingerprint.

In a non-limiting embodiment, the determining module 52 may include: an obtaining sub-module 521, configured to obtain gray values of pixels at a plurality of preset positions in the to-be-identified fingerprint image; a fitting sub-module 522, configured to fit the gray values of the pixels at the plurality of preset positions to identify whether a periodically changing curve can be obtained; and a first determining sub-module 523, configured to determine the to-be-identified fingerprint belongs to the first type of fingerprint if it is identified that the periodically changing curve cannot be obtained.

Further, the determining module 52 may further include: a first calculating sub-module 524, configured to calculate a contrast of the to-be-identified fingerprint image according to the gray values of the pixels at the plurality of preset positions, if it is identified that the periodically changing curve can be obtained; an identifying sub-module 525, configured to identify whether the contrast is larger than a first preset threshold; and a second determining sub-module 526, configured to determine the to-be-identified fingerprint belongs to the first type of fingerprint if it is identified that the contrast is smaller than the first preset threshold.

In a non-limiting embodiment, the first calculating sub-module 524 may include: a first determining unit 5241, configured to determine a maximum gray value and a minimum gray value among the gray values of the pixels at the plurality of preset positions according to the periodically changing curve obtained by the fitting; and a first calculating unit 5242, configured to calculate the contrast of the to-be-identified fingerprint image according to the maximum gray value and the minimum gray value.

In a non-limiting embodiment, the obtaining sub-module 521 may include: an auxiliary line generating unit 5211, configured to make at least one auxiliary line on the to-be-identified fingerprint image; and a second determining unit 5212, configured to determine the pixels of the to-be-identified fingerprint image which each of the at least one auxiliary line passes through as the pixels at the plurality of preset positions.

In another non-limiting embodiment, the identifying module 52 may include: a third determining sub-module 527, configured to determine the to-be-identified fingerprint belongs to the first type of fingerprint if the environment parameter is smaller than a second preset threshold.

Further, the environment parameter is selected from a temperature and a humidity.

In a non-limiting embodiment, the fingerprint identification apparatus 5 further includes: a prompting module 55, configured to send a prompt information for prompting to collect an auxiliary to-be-identified fingerprint image of the to-be-identified fingerprint, before calculating the image correlation between the to-be-identified fingerprint image and the standard fingerprint image, if it is identified that the to-be-identified fingerprint belongs to the first type of fingerprint; a second collecting module 56, configured to collect the to-be-identified fingerprint image according to the auxiliary to-be-identified fingerprint image; a correcting module 57, configured to correct the to-be-identified fingerprint image according to the auxiliary to-be-identified fingerprint image; and a second calculating module 58, configured to calculate the image correlation between the corrected to-be-identified fingerprint image and the standard fingerprint image.

Further, the second collecting module 56 and the first collecting module 51 may perform the same function, and the two may be the same module, or may be two modules independent of each other.

Further, the second calculating module 58 and the first calculating module 53 may perform the same function, and the two may be the same module, or may be two modules independent of each other.

In a non-limiting embodiment, the first calculating module 53 may include: a second calculating sub-module 531, configured to calculate an image correlation of the to-be-identified fingerprint image and at least one offset image of the standard fingerprint image respectively; and a fourth determining sub-module 532, configured to determine an image correlation having a maximum value as the image correlation between the to-be-identified fingerprint image and the standard fingerprint image.

In a non-limiting embodiment, the second calculating sub-module 531 may include: a second calculating unit 5311, configured to calculate the image correlation between the to-be-identified fingerprint image and the offset image according to the gray value of each pixel of the to-be-identified fingerprint image and the gray value of a corresponding pixel of the offset image for each offset image of the standard fingerprint image.

In a non-limiting embodiment, the second calculating unit 5311 may include: a third calculating unit 53111, configured to traverse each pixel of the to-be-identified fingerprint image, and calculate a correlation between the gray value of the pixel of the to-be-identified fingerprint image and the gray value of the corresponding pixel of the offset image; and a normalizing process unit 53112, configured to normalize the calculated correlation to obtain the image correlation between the to-be-identified fingerprint image and the offset image according to the gray values of the to-be-identified fingerprint image and the gray values of the standard fingerprint image.

In a non-limiting embodiment, the calculated image correlation is normalized by the normalizing process unit 53112 based on the following formula:

$$C(m, l) = \frac{\sum_{ij} N_{ij} \cdot M_{i+m,j+l}}{\sqrt{\sum_{ij} N_{ij}^2} \sqrt{\sum_{ij} M_{ij}^2}}$$

wherein, $C(m, l)$ is the image correlation between the to-be-identified fingerprint image and the offset image, m is a line offset value of the offset image relative to the standard fingerprint image, l is a column offset value of the offset image relative to the standard fingerprint image, $$\sum_{ij} N_{ij} \cdot M_{i+m,j+l}$$

is the calculated correlation, $$\sqrt{\sum_{ij} N_{ij}^2} \sqrt{\sum_{ij} M_{ij}^2}$$

is a normalization measurement standard, $N_{ij}$ is the gray value of the pixel at the i-th row and j-th column of the to-be-identified fingerprint image, $M_{ij}$ is the gray value of the pixel at the i-th row and j-th column of the standard fingerprint image, and $M_{i+m,j+l}$ is the gray value of the pixel at the (i+m)-th row and (j+l)-th column of the offset image, wherein i is a positive integer, and j is a positive integer.

For more details on the working principle and working mode of the fingerprint identification apparatus 5, reference may be made to the related descriptions in FIGS. 1 to 4 above, and details are not described herein again.

Further, an embodiment of the present disclosure provides a storage medium, having stored thereon computer instructions, wherein the computer instructions are executed to perform steps of the fingerprint identification method in the embodiments as shown in FIGS. 1 to 4. In some embodiment, the storage medium may include a computer readable storage medium such as a non-volatile memory or a non-transitory memory. The storage medium may include a ROM, a RAM, a magnetic disk, an optical disk, or the like.

Further, an embodiment of the present disclosure provides a terminal, including a memory and a processor, wherein the memory has stored thereon computer instructions executable on the processor, and the computer instructions are executed to perform steps of the fingerprint identification method in the embodiments as shown in FIGS. 1 to 4. In some embodiment, the terminal may be a computing device such as a mobile phone or a computer.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A fingerprint identification method, comprising:
capturing a to-be-identified fingerprint image of a to-be-identified fingerprint;
identifying whether the to-be-identified fingerprint belongs to a first type of fingerprint;
when it's determined that the to-be-identified fingerprint belongs to the first type of fingerprint, determining whether the to-be-identified fingerprint is consistent with a standard fingerprint according to an image correlation between the to-be-identified fingerprint image and a standard fingerprint image;
when it's determined that the to-be-identified fingerprint does not belong to the first type of fingerprint, determining whether the to-be-identified fingerprint is consistent with the standard fingerprint according to a feature point matching result between the to-be-identified fingerprint image and the standard fingerprint image;
wherein the standard fingerprint image is a fingerprint image of a standard fingerprint.

2. The fingerprint identification method according to claim 1, wherein identifying whether the to-be-identified fingerprint belongs to the first type of fingerprint comprises:
identifying whether the to-be-identified fingerprint belongs to the first type of fingerprint according to an image information of the to-be-identified fingerprint image and/or an environment parameter.

3. The fingerprint identification method according to claim 2, wherein identifying whether the to-be-identified fingerprint belongs to the first type of fingerprint further comprises:
fitting gray values of pixels at a plurality of preset positions to identify whether a periodically changing curve can be obtained.

4. The fingerprint identification method according to claim 3, wherein identifying whether the to-be-identified fingerprint belongs to the first type of fingerprint further comprises:
determining the to-be-identified fingerprint belongs to the first type of fingerprint if it is identified that the periodically changing curve cannot be obtained.

5. The fingerprint identification method according to claim 3, wherein identifying whether the to-be-identified fingerprint belongs to the first type of fingerprint further comprises:
calculating a contrast of the to-be-identified fingerprint image according to the gray values of the pixels at the plurality of preset positions, when it is identified that the periodically changing curve can be obtained;
identifying whether the contrast is greater than a first preset threshold.

6. The fingerprint identification method according to claim 5, further comprising:
determining the to-be-identified fingerprint belongs to the first type of fingerprint when any one or any combination of the following conditions are met: it is identified that the contrast is smaller than the first preset threshold, it is identified that the periodically changing curve cannot be obtained, or if the environment parameter is smaller than a second preset threshold.

7. The fingerprint identification method according to claim 5, wherein calculating a contrast of the to-be-identified fingerprint image according to the gray values of the pixels at the plurality of preset positions comprises:
determining a maximum gray value and a minimum gray value among the gray values of the pixels at the plurality of preset positions according to the obtained periodically changing curve;
calculating the contrast of the to-be-identified fingerprint image according to the maximum gray value and the minimum gray value.

8. The fingerprint identification method according to claim 3, further comprising:
making at least one auxiliary line on the to-be-identified fingerprint image; and
determining pixels of the to-be-identified fingerprint image which each of the at least one auxiliary line passes through as the pixels at the plurality of preset positions.

9. The fingerprint identification method according to claim 2, wherein identifying whether the to-be-identified fingerprint belongs to the first type of fingerprint according to an environment parameter comprises:
determining the to-be-identified fingerprint belongs to the first type of fingerprint when the environment parameter is less than a second preset threshold.

10. The fingerprint identification method according to claim 2, wherein the environment parameter is a temperature and/or a humidity.

11. The fingerprint identification method according to claim 2, wherein when it's determined that the to-be-identified fingerprint belongs to the first type of fingerprint, determining whether the to-be-identified fingerprint is consistent with a standard fingerprint according to an image correlation between the to-be-identified fingerprint image and a standard fingerprint image comprises:
sending a prompt information for prompting to capture an auxiliary to-be-identified fingerprint image of the to-be-identified fingerprint;
capturing the auxiliary to-be-identified fingerprint image of the to-be-identified fingerprint;
correcting the to-be-identified fingerprint image according to the auxiliary to-be-identified fingerprint image;
calculating the image correlation between the corrected to-be-identified fingerprint image and the standard fingerprint image; and
determining whether the to-be-identified fingerprint is consistent with the standard fingerprint according to an image correlation between the corrected to-be-identified fingerprint image and a standard fingerprint image.

12. The fingerprint identification method according to claim 1, wherein identifying whether the to-be-identified fingerprint belongs to the first type of fingerprint further comprises:
determining the to-be-identified fingerprint belongs to the first type of fingerprint when an appropriate number of feature points cannot be extracted from the fingerprint image, or the number of feature points that can be extracted from the fingerprint image is less than a preset threshold.

13. The fingerprint identification method according to claim 1, wherein the first type of fingerprint comprises fingerprint of a finger having shallow skin ridge at a finger pulp, fingerprint of a finger with a higher dryness, fingerprint of a finger with insufficient sebum secretion, feature points cannot be extracted from the captured to-be-identified fingerprint images, or the number of feature points that can be extracted from the captured to-be-identified fingerprint images is less than a preset threshold.

14. The fingerprint identification method according to claim 1, wherein when it's determined that the to-be-identified fingerprint belongs to the first type of fingerprint, the method further comprises:
    calculating an image correlation of the to-be-identified fingerprint image and at least one offset image of the standard fingerprint image respectively; and
    determining an image correlation having a maximum value as the image correlation between the to-be-identified fingerprint image and the standard fingerprint image.

15. The fingerprint identification method according to claim 14, wherein calculating an image correlation of the to-be-identified fingerprint image and at least one offset image of the standard fingerprint image respectively comprises:
    for each offset image of the standard fingerprint image, calculating the image correlation between the to-be-identified fingerprint image and the each offset image according to a gray value of each pixel of the to-be-identified fingerprint image and a gray value of a corresponding pixel of the each offset image.

16. The fingerprint identification method according to claim 15, further comprising:
    normalizing the calculated image correlation according to the gray values of the to-be-identified fingerprint image and the gray values of the standard fingerprint image to obtain the image correlation between the to-be-identified fingerprint image and the offset image.

17. The fingerprint identification method according to claim 1, wherein the offset image refers to an image obtained by offsetting the standard fingerprint image by a row or a column of pixels with respect to the to-be-identified fingerprint image, taking a position where the standard fingerprint image coincides with the to-be-identified fingerprint image as a reference.

18. A non-transitory storage medium, having stored thereon computer instructions, wherein the computer instructions are executed to perform steps of the fingerprint identification method according to claim 1.

19. A terminal, comprising a memory and a processor, wherein the memory has stored thereon computer instructions executable on the processor, and the computer instructions are executed by the processor to perform steps of the fingerprint identification method according to claim 1.

20. A fingerprint identification apparatus, comprising:
    a first collecting module, configured to capture a to-be-identified fingerprint image of a to-be-identified fingerprint;
    an identifying module, configured to identify whether the to-be-identified fingerprint belongs to a first type of fingerprint;
    a first calculating module, configured to calculate an image correlation between the to-be-identified fingerprint image and a standard fingerprint image when it's determined that the to-be-identified fingerprint belongs to the first type of fingerprint, and configured to calculate a feature point matching result between the to-be-identified fingerprint image and the standard fingerprint image when it's determined that the to-be-identified fingerprint does not belong to the first type of fingerprint, wherein the standard fingerprint image is a fingerprint image captured from a standard fingerprint; and
    a determining module, configured to determine whether the to-be-identified fingerprint is consistent with the standard fingerprint according to the calculated image correlation or the feature point matching result.

* * * * *